United States Patent
Maier et al.

[19]

[11] Patent Number: 5,911,366

[45] Date of Patent: Jun. 15, 1999

[54] PERFORATED VALVE SPRAY DISK

[75] Inventors: Martin Maier, Möglingen; Norbert Belzner, Lauffen; Jörg Heyse, Markgröningen; Christian Preussner, Bamberg, all of Germany

[73] Assignee: Robert Bosch GmbH, Stuttgart, Germany

[21] Appl. No.: 08/467,326

[22] Filed: Jun. 6, 1995

Related U.S. Application Data

[63] Continuation of application No. 08/202,416, Feb. 28, 1994, abandoned.

[30] Foreign Application Priority Data

Mar. 6, 1993 [DE] Germany ............... 43 07 159

[51] Int. Cl.$^6$ ........................ B05B 1/14
[52] U.S. Cl. .................. 239/553.3; 239/590.5; 239/596
[58] Field of Search .............. 239/533.12, 553.3, 239/553.5, 585.4, 590.3, 590.5, 596, 533.14, 548, 552

[56] References Cited

U.S. PATENT DOCUMENTS

| | | | |
|---|---|---|---|
| 1,657,372 | 1/1928 | Danielsson | 239/596 X |
| 2,188,354 | 1/1940 | Hudson | 239/533.14 |
| 3,402,893 | 9/1968 | Hindman | 239/533.14 |
| 3,711,031 | 1/1973 | Ewald | 239/596 X |
| 4,018,387 | 4/1977 | Erb et al. | 239/533.14 |
| 4,080,700 | 3/1978 | Muller . | |
| 4,586,226 | 5/1986 | Fakler et al. | 29/157 R |
| 4,639,568 | 1/1987 | Check et al. | 219/69 M |
| 4,703,142 | 10/1987 | Dzewaltowski et al. | 219/69 M |
| 4,721,839 | 1/1988 | Dzewaltowski et al. | 219/69 M |
| 4,907,748 | 3/1990 | Gardner et al. | 239/596 X |
| 4,995,949 | 2/1991 | Rhoades | 204/15 |
| 5,012,983 | 5/1991 | Buchholz et al. | 239/553.5 X |
| 5,016,819 | 5/1991 | Wood | 239/553.3 X |
| 5,092,039 | 3/1992 | Gaskell | 239/533.12 X |
| 5,263,648 | 11/1993 | Vogt et al. | 239/585.4 |

FOREIGN PATENT DOCUMENTS

| | | | |
|---|---|---|---|
| 1056529 | 10/1953 | France | 239/533.12 |
| 3801778 | 7/1989 | Germany . | |
| 42 21 185 | 1/1994 | Germany . | |
| 667463 | 3/1952 | United Kingdom | 239/533.12 |
| 2225809 | 6/1990 | United Kingdom | 239/533.12 |

OTHER PUBLICATIONS

R. 25323 Bosch Patent Application, Jun. 24, 1992 (No Translation).

W. Krause, "Micromechanical Fabrication Methods," from "Structural Elements of Precision Mechanics," Carl Hanser Publishers, Munich/Vienna, pp. 738–742 (1989).

K. Petersen, "Silicon as a Mechanical Material," *Proceedings of the IEEE*, vol. 70, No. 5, May 1982, pp. 420–456.

*Primary Examiner*—Andres Kashnikow
*Assistant Examiner*—Lisa Ann Douglas
*Attorney, Agent, or Firm*—Kenyon & Kenyon

[57] ABSTRACT

A perforated spray disk, particularly suitable for use in injection valves of fuel injection systems of internal combustion engines. The spray disk has at least one conical spray opening which expands in the direction of flow.

2 Claims, 3 Drawing Sheets

PERFORATED VALVE SPRAY DISK

This application is a continuation of application Ser. No. 08/202,416, filed Feb. 28, 1994, now abandoned.

FIELD OF THE INVENTION

The invention relates to a perforated spray disk for a valve, and to a method for producing spray openings in a perforated spray disk.

BACKGROUND OF THE INVENTION

In German patent application P 42 21 185.9 it has already been proposed to generate, by punching or electrical discharge machining (EDM), spray openings in perforated spray disks. The spray openings possess a non-cylindrical shape after an additional process step involving partial deep drawing of the perforated spray disk. In this known perforated spray disk, the spray openings are first produced vertically and cylindrically in a flat piece of sheet metal by punching or electrical discharge machining. In a subsequent process step a central region of the perforated spray disk, in which the spray openings are located, is plastically deformed by deep drawing, causing the central region of the perforated spray disk to take on a domed shape. The result of the deep drawing is that the spray openings are stretched farther out downstream than upstream, so that truncated conical flares of the spray openings are produced.

In addition to DE-OS 38 01 778 mentioned above, it is also already known from U.S. Pat. No. 4,080,700 to use flaring spray holes in a spray plate. The spray holes produced in the spray plate each have a triangular cross section; the triangles being approximately equilateral. After the spray holes are produced, the spray plate is domed with a punch, so that as a result the spray holes flare out in the direction of motion of the punch, since the spray holes are stretched farther out downstream than upstream. Thus at least two mutually independent manufacturing methods are needed to achieve this configuration of the spray holes. The flares of the spray holes cannot be completely symmetrical over their entire length because of the doming of the spray plate.

Since the central region of the perforated spray disk is domed, at least one spray opening is inclined with respect to a lengthwise valve axis, and the truncated conical flare is not necessarily completely symmetrical over the entire length of the spray opening. The spray openings are therefore produced in an unflared shape, and only expanded downstream by an additional process.

Moreover, it is also known from DE-OS 38 01 778 to use for fuel injection valves a diaphragm made of a material with great natural hardness, for example monocrystalline silicon, whose fuel discharge openings are produced by etching. In order to produce contours for the fuel discharge openings which deviate from a cylindrical shape, another complex and costly treatment with high-energy radiation, e.g. laser radiation, is used after the etching step.

SUMMARY AND ADVANTAGES OF THE INVENTION

The present invention provides a perforated spray disk for a valve having a lengthwise valve axis and a fluid flow direction comprising: a spray disk central region, the central region having at least one spray opening; the at least one spray opening having a truncated conical form which expands in the flow direction around an opening axis; and the opening axis and the lengthwise valve axis being parallel.

An advantage of the spray disk is that because of the at least single spray opening with positive conicality—i.e. with a wall that flares downstream in truncated conical form—extending parallel to the lengthwise valve axis, the medium separates from the wall of the spray opening as it flows through, except at the flow inlet which acts as an aperture. The wall of the spray opening extends in a completely symmetrical manner about one opening axis. A particular advantage of this configuration of the spray opening is the elimination of additional processing methods, so that the shape of the spray opening originally created by electrical discharge machining can remain.

The spray openings with positive conicality produced parallel to the lengthwise valve axis have the advantage of preventing the flow from skipping against the inner wall, so that variations in the volume of medium flowing through the spray openings can be minimized when large quantities of parts are manufactured.

The present invention for producing spray openings in a perforated spray disk also provides a method for producing a perforated spray disk with at least one spray opening comprising the steps of: (a) removing particles from the perforated spray disk by electrical discharge machining perpendicular to a surface of the perforated spray disk; and (b) flushing the detached particles out with a dielectric so that a conical spray opening results.

An advantage of this method is that is allows for particularly simple, time-saving, and cost-effective production of the spray openings in the perforated spray disk which flare out in a truncated conical shape. The at least single spray opening is produced with extreme accuracy, parallel to the lengthwise spray axis, with no need for further processing of the spray opening thereafter. Using a tool electrode that penetrates into the perforated spray disk against the later flow direction of the medium (for example fuel), perforated spray disk material is eroded away and flushed out with a dielectric, against the motion of the tool electrode, through a working gap. In the process, the conical shape of the spray opening, which has its greatest diameter where the tool electrode enters the perforated spray disk, is produced simply because the spark path from the tool electrode to the wall of the spray opening is shortened by the detached particles flushed away along with the dielectric. In order to retain, after the tool electrode has broken through the perforated spray disk, the conicality that is produced during electrical discharge machining and is desired in the interest of minimal variation in flow volume, it is particularly advantageous to use a dielectric to counterflush from the side of the perforated spray disk opposite to the insertion of the tool electrode. The dielectric, utilized under pressure, ensures that the detached particles emerge from the perforated spray disk only in the direction of entry of the tool electrode, and reinforces flushing in the opposite direction from the EDM process. The originally generated conicality of the spray opening is thus retained.

It is also advantageous that the central region is flat, which allows the fluid which passes through the spray openings to be directed straight ahead.

BRIEF DESCRIPTION OF THE DRAWINGS

An exemplary embodiment of the invention is depicted in simplified form with reference to the following drawings, and explained further in the detailed description below.

DETAILED DESCRIPTION

Figure 1:
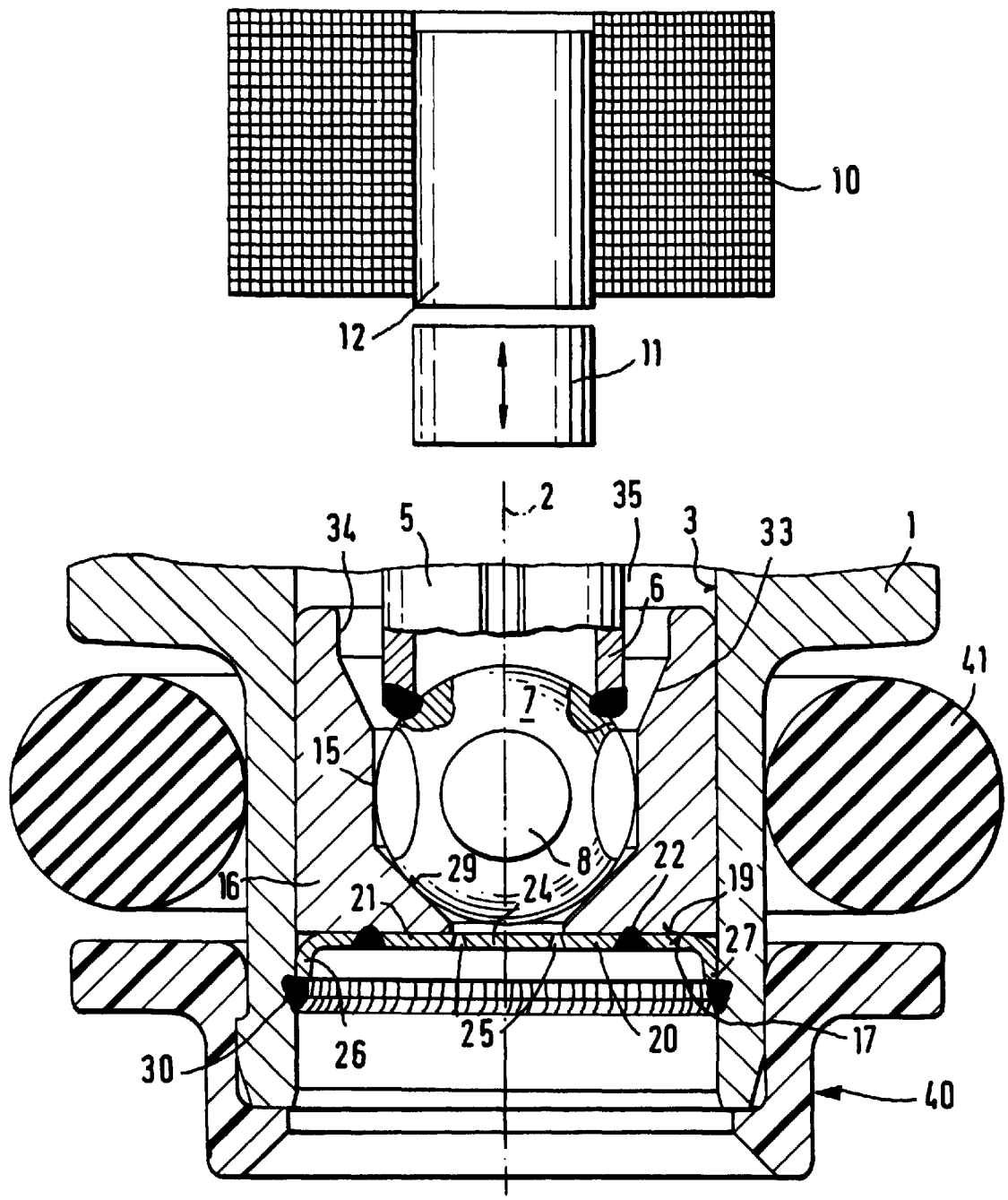
FIG. 1 shows a partial depiction of a fuel injection valve with a perforated spray disk according to the invention.

FIG. 1 partly depicts, as an exemplary embodiment, a valve in the form of an injection valve for fuel injection systems of mixture-compressing, externally-ignited internal combustion engines. The injection valve has a tubular valve seat support 1 in which a lengthwise opening 3 is present concentrically with a lengthwise valve axis 2. Arranged in the lengthwise opening 3 is a valve needle 5, for example tubular in shape, which is attached at its upstream end 6 to a valve closure element 7, for example spherical in shape, on whose periphery for example five flattened areas 8 are provided.

The injection valve is actuated in a known manner, for example electromagnetically. An indicated electromagnetic circuit with a magnet coil 10, an armature 11, and a core 12 is used to move valve needle 5 axially and thus to open the injection valve against the spring force of a return spring (not depicted) and to close it. Armature 11 is attached to the end of valve needle 5 that faces away from valve closure element 7 by, for example, a weld bead produced by a laser, and is aligned with core 12. Magnet coil 10 surrounds core 12, which represents the end, enclosed by magnet coil 10, of an inlet tube (not shown in greater detail) used to deliver the medium (in this case fuel) being metered by the valve.

A guide opening 15 of a valve seat element 16 guides valve closure element 7 during its axial motion. The cylindrical valve seat element 16 is mounted in a sealed manner, for example by welding, in lengthwise opening 3 extending concentrically with lengthwise valve axis 2 into the end of valve seat support 1 which lies downstream and opposite core 12. The periphery of valve seat element 16 has a slightly smaller diameter than lengthwise opening 3 of valve seat support 1. At its lower surface 17 facing away from valve closure element 7, valve seat element 16 is concentrically and permanently attached to a bottom part 20 of a perforated spray disk 21, which is for example cup-shaped, so that an upper surface 19 of bottom part 20 rests against lower surface 17 of valve seat element 16.

Valve seat element 16 and perforated spray disk 21 are attached, for example, by a peripheral, sealed first weld bead 22 produced, for example, with a laser. This type of assembly eliminates the risk of undesired deformation of bottom part 20 in its central region 24, in which at least one, or for example four, spray openings 25 that are formed by EDM and have positive conicality, i.e. that flare downstream in truncated conical fashion, are located.

Continuous with bottom part 20 of cup-shaped perforated spray disk 21 is a circumferential retaining rim 26 that extends axially away from valve seat element 16 and is bent outward conically toward its end 27. Retaining rim 26 has at its end 27 a greater diameter than the diameter of lengthwise opening 3 of valve seat support 1. Since the peripheral diameter of valve seat element 16 is less than the diameter of lengthwise opening 3 of valve seat support 1, only a radial press fit is present between lengthwise opening 3 and retaining rim 26 of perforated spray disk 21, which is bent slightly outward in conical fashion. Retaining rim 26 thereby exerts a radial spring action on the wall of lengthwise opening 3. This prevents chip formation on the valve seat part and on lengthwise opening 3 when the valve seat part, consisting of valve seat element 16 and perforated spray disk 21, is inserted into lengthwise opening 3 of valve seat support 1.

The depth to which the valve seat part, consisting of valve seat element 16 and cup-shaped perforated spray disk 21, is inserted into lengthwise opening 3 determines the preset stroke length of valve needle 5, since the one end position of valve needle 5 when magnet coil 10 is not energized is defined by contact between valve closure element 7 and a valve seating surface 29 of valve seat element 16.

The other end position of valve needle 5 when magnet coil 10 is energized is defined, for example, by contact between armature 11 and core 12. The distance between these two end positions of valve needle 5 thus represents the stroke length.

Retaining rim 26 of perforated spray disk 21 is attached at its end 27 to the wall of lengthwise opening 3, for example by means of a peripheral, sealed second weld bead 30. Second weld bead 30, like first weld bead 22, is produced for example by means of a laser. Sealed welding of valve seat element 16 to perforated spray disk 21, and of perforated spray disk 21 to valve seat support 1, is needed so that the medium used cannot flow through between lengthwise opening 3 of valve seat support 1 and the periphery of valve seat element 16 to spray openings 25, or between lengthwise opening 3 of valve seat support 1 and retaining rim 26 of the cup-shaped perforated spray disk 21 directly into an intake duct of the internal combustion engine.

The spherical valve closure element 7 interacts with valve seating surfaces 29, which taper in truncated conical fashion in the flow direction, of valve seat element 16, which extends axially between guide opening 15 and lower surface 17 of valve seat element 16. Valve seat element 16 has a valve seat element opening 34, facing magnet coil 10, which has a greater diameter than the diameter of guide opening 15 of valve seat element 16. A segment 33 adjoining valve seat element opening 34 in the direction of perforated spray disk 21 is characterized by its truncated conical taper down to the diameter of guide opening 15. Valve seat element opening 34, with its adjacent truncated conical segment 33, serves as a flow inlet, so that the medium can flow from a valve interior 35 delimited radially by lengthwise opening 3 of valve seat support 1 to guide opening 15 of valve seat element 16.

To ensure that the flow of medium also reaches spray openings 25 of perforated spray disk 21, for example five flattened areas 8 are produced on the periphery of spherical valve closure element 7. The five circular flattened areas 8 allow the medium to flow through, when the injection valve is open, from valve interior 35 to spray openings 25 of perforated spray disk 21 which flare out in truncated conical form. For precise guidance of valve closure element 7 and thus of valve needle 5 during axial motion, the diameter of guide opening 15 is such that the spherical valve closure element 7 projects beyond its flattened areas 8 through guide opening 15 with a slight radial spacing.

A protective cap 40 is arranged at the periphery of valve seat support 1 at its downstream end facing away from magnet coil 10, and attached to valve seat support 1 for example by means of a snap-on connection. A sealing ring 41 provides sealing between the periphery of the injection valve and a valve receptacle (not shown), for example the intake duct of the internal combustion engine.

Figure 2:
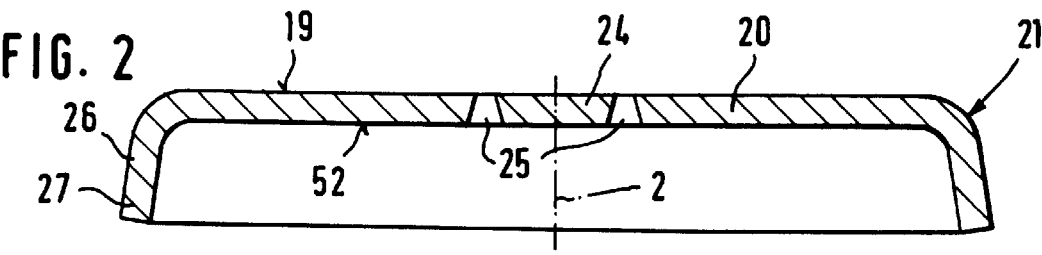
FIG. 2 shows the perforated spray disk according to the invention.

FIG. 2 shows perforated spray disk 21 with its spray openings 25 arranged in central region 24 which flare out downstream in a truncated conical shape, i.e. have positive conicality facing in the flow direction. The for example four spray openings 25 are located, for example, symmetrically about lengthwise valve axis 2, distributed in the form of the corners of a square, and are thus each at the same distance from one another and from lengthwise valve axis 2. The spray disk has an upper surface 19 and lower surface 52.

Figure 3:
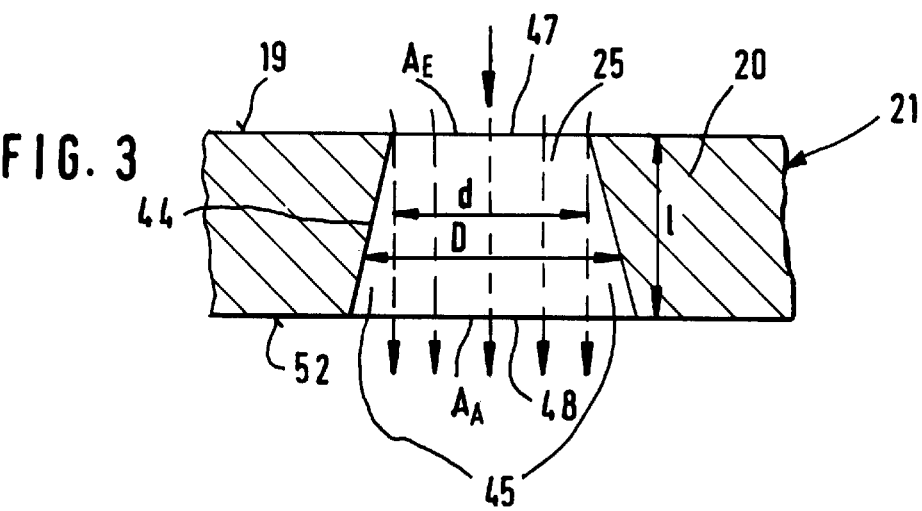
FIG. 3 shows a spray opening according to the invention with positive conicality.

FIG. 3 depicts an enlarged spray opening 25 with positive conicality in bottom part 20 of perforated spray disk 21. The dashed lines with arrows illustrate the flow of the medium, for example a fuel, inside spray opening 25. As fuel flows through spray opening 25, an annular region 45 of flow separation, in which there is almost no contact between the flow of medium and wall 44 of spray opening 25, occurs as a result of the flow velocity and a wall 44 of spray opening 25 that flares out in a truncated conical shape. The outside diameter D of this almost medium-free annular region 45 expands downstream along with the diameter of spray opening 25. The inside diameter d of annular region 45 remains largely constant, since it is formed by the edge of the medium as it flows vertically downstream. Ideally, the annular flow separation region 45 begins immediately downstream of a flow inlet 47 of spray opening 25.

Thus the spray openings 25 are configured so that an aperture effect with flow constriction is achieved at flow inlet 47. Because spray opening 25 flares out immediately downstream from flow inlet 47, the flowing medium lifts away from wall 44 of spray opening 25 after flow inlet 47, which acts as an aperture. Reattachment of the flow to wall 44 of spray opening 25 after entering spray opening 25 is prevented, in an advantageous manner, by the positive conicality, thus eliminating, for example, fluctuations in static flow volume $Q_{stat}$. The greatest diameter of spray opening 25 at flow outlet 48 is, for example, 5 to 20 micrometers greater than the diameter of spray opening 25 at flow inlet 47, for a length l of approximately 200 micrometers for spray opening 25. Configuring spray openings 25 in perforated spray disk 21 according to the invention with positive conicality ensures that flow skipping does not occur, i.e. that the flow cannot alternate between a state in contact with wall 44 and a state separated from wall 44, so that the flow volume per unit time remains constant. Spray openings 25 with positive conicality consequently prevent flow skipping along wall 44 of spray opening 25, and thus also prevent quantitative changes in static flow volume $Q_{stat}$, meaning most importantly that variations in flow volume through spray openings 25 can be kept very low when large numbers of perforated spray disks are manufactured.

Figure 3A:
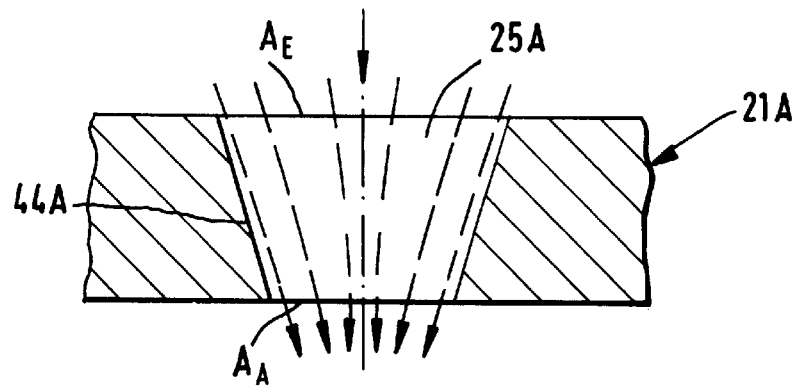
FIGS. 3A and 3B show spray openings with negative conicality and a cylindrical form, respectively.
Figure 3B:
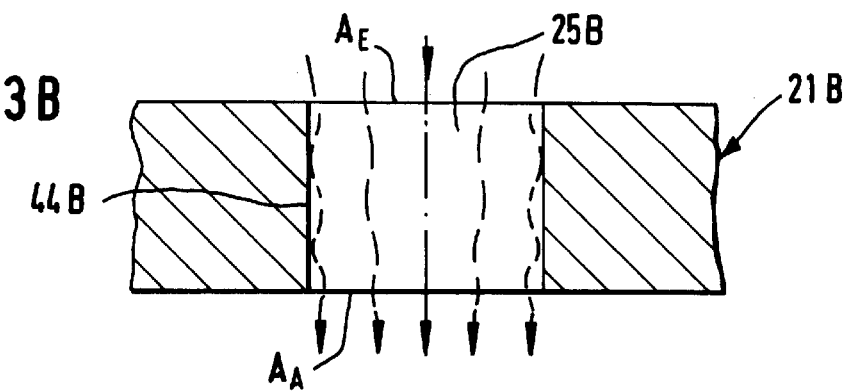

In contrast to this, FIG. 3A shows a spray opening 25A with negative conicality in a perforated spray disk 21A, and FIG. 3B shows a cylindrical spray opening 25B, with no conicality, in a perforated spray disk 21B.

The flow of medium passing through spray opening 25A, which is again indicated by dashed lines and arrows, is in contact with a wall 44A of spray opening 25A that is of truncated conical shape and tapers downstream, but can separate if perforated spray disk 21A is even minimally off-axis. The consequence of spray openings 25A with negative conicality is that considerable fluctuations in flow volume can occur due to differences in flowthrough time and alternation between attached and separated flow. The problem of alternation between attached and separated flow at a wall 44B can also occur in the cylindrical spray opening 25B depicted in FIG. 3B, in which the attached and separated flow is shown in simplified and exaggerated fashion. Electrical discharge machining of spray openings 25B in precisely cylindrical form, with deviations in the nanometer range, is moreover extremely cost-intensive, so that each cylindrical spray opening 25B still has some minimal positive and/or negative conicality; this explains the variations in flow volume of the medium through spray openings 25B when large numbers of perforated spray disks 21B are manufactured.

Figure 3C:
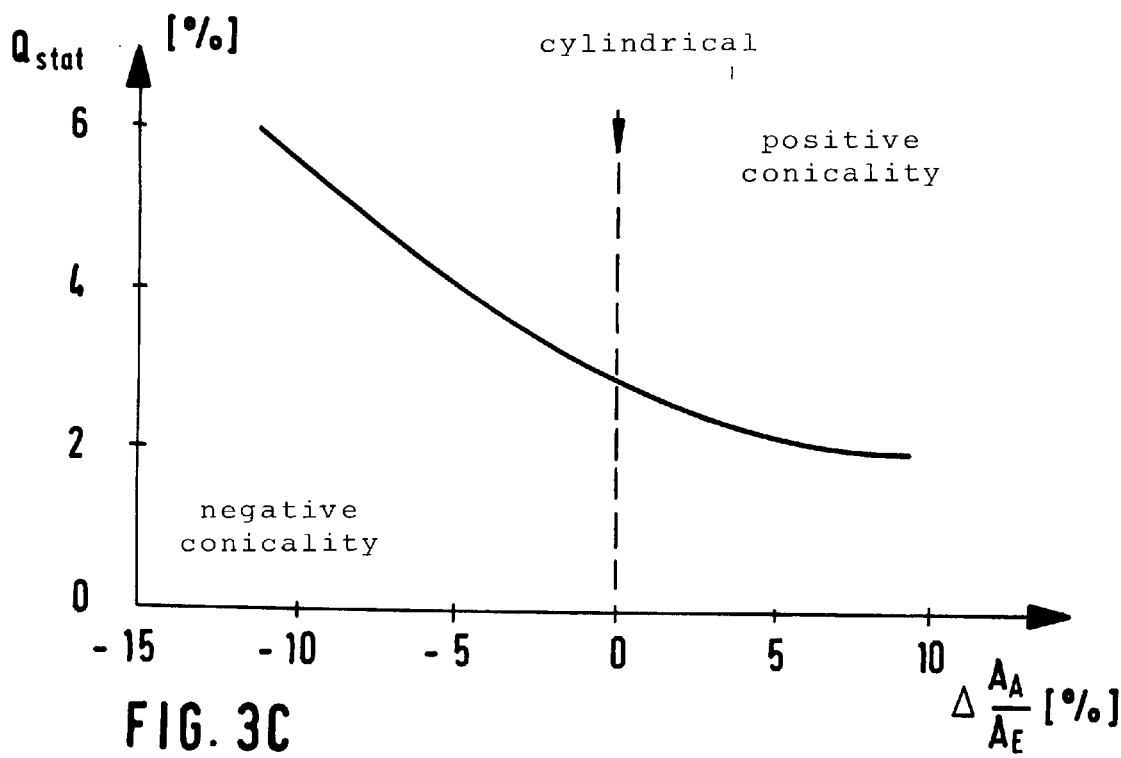
FIG. 3C is a diagram of the variation in static flow volumes through the spray openings shown in FIGS. 3, 3A, and 3B as a function of conicality.

FIG. 3C shows a diagram of the variation in static flow volume $Q_{stat}$ as a function of the conicality of spray openings 25, 25A, and 25B, which is plotted as the difference between outlet surface area $A_A$ and inlet surface area $A_E$. This clearly illustrates the much lower variation in flow volume with spray openings 25 having positive conicality, compared with cylindrical spray openings 25B and spray openings 25A having negative conicality.

Figure 4:
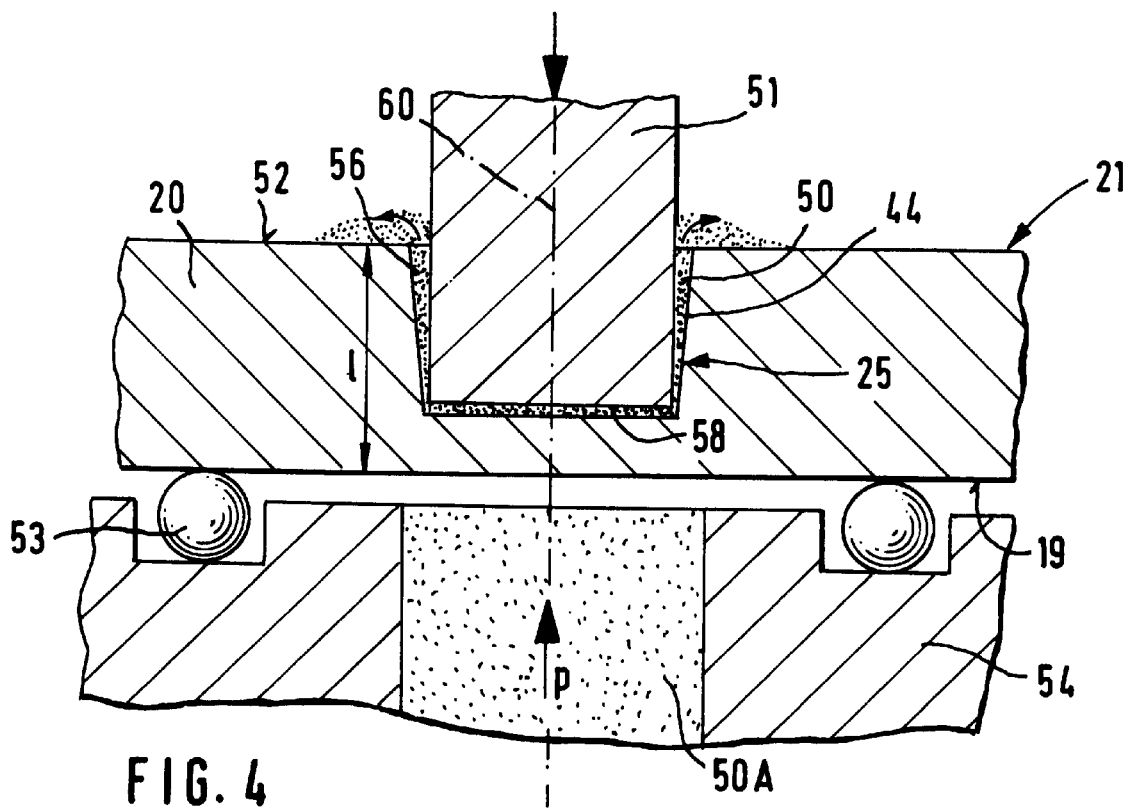
FIG. 4 shows the production of a perforated spray disk according to the invention.

Spray openings 25 with positive conicality are produced with an electrical discharge machining method that is depicted in simplified and schematic form in FIG. 4, using a dielectric 50 such as, for example, water. Electrical discharge machining is a method in which short-duration, nonsteady-state, temporally distinct discharges take place between a tool electrode 51 and the workpiece, in this case perforated spray disk 21, in order to remove material from the workpiece. The fluid dielectric 50 is provided between tool electrode 51 and perforated spray disk 21. This makes it possible to transfer the contour of tool electrode 51, manufactured to a specific dimension and shape, into spray opening 25 of perforated spray disk 21. To guarantee defined seating of perforated spray disk 21, and to ensure that tool electrode 51 is inserted into perforated spray disk 21 precisely perpendicular to a lower surface 52 of bottom part 20 of perforated spray disk 21, perforated spray disk 21 is precisely mounted by means of bearings 53 on, for example, a workpiece table 54.

Machining of perforated spray disk 21 to form spray openings 25 thus takes place from the downstream lower surface 52, i.e. the EDM process occurs in a direction opposite to the later direction of fuel flow. Outlet surface $A_A$ of spray opening 25 is produced at lower surface 52 of perforated spray disk 21, which during the EDM process faces tool electrode 51; and inlet surface $A_E$ of spray opening 25 is produced at upper surface 19 of perforated spray disk 21. As tool electrode 51 penetrates through perforated spray disk 21 from lower surface 52 to upper surface 19, flushing with dielectric 50 occurs without pressurization on the electrode side. In addition to flushing out detached particles, dielectric 50 cools tool electrode 51 and provides insulation. Flushing with dielectric 50 occurs from lower surface 52 of perforated spray disk 21, until upper surface 19 of perforated spray disk 21 is reached. Until tool electrode 51 has penetrated through the material of perforated spray disk 21, the detached particles must be conveyed to lower surface 52 and there flushed out.

Because of the time difference between electrical discharge machining at lower surface 52 of perforated spray disk 21 and electrical discharge machining at upper surface 19 of perforated spray disk 21, and the distance traveled by the detached particles emerging from working gap 56 formed between tool electrode 51 and wall 44 of spray opening 25 as it is being created, unequal amounts of material are eroded away from wall 44 over length l. Specifically, as they travel toward lower surface 52, the particles shorten the spark path from tool electrode 51 to wall 44, so that more material is removed at the entry point of tool electrode 51 than at the instantaneous position of front end 58 of tool electrode 51. The EDM process in perforated spray disk 21 thus produces a conical contour of wall 44 until upper surface 19 is reached.

Immediately after tool electrode 51 breaks through at upper surface 19 of perforated spray disk 21, the detached particles can emerge in the direction of workpiece table 54, so that the resulting conicality of wall 44 would be very quickly compensated for and the completed spray opening 25 would take on a cylindrical shape. In order to retain the conicality produced during electrical discharge machining, which is desired for the sake of minimizing flow volume variations, a dielectric 50A, for example also water, is made ready for counterflushing, for example through a passage in workpiece table 54. The direction of counterflushing with dielectric 50A is from workpiece table 54 into spray opening 25 of perforated spray disk 21. It is particularly important that counterflushing with dielectric 50A be present even while the EDM process is taking place in perforated spray disk 21, so that as soon as tool electrode 51 breaks through the material of perforated spray disk 21, counterflushing is already effective at upper surface 19.

To prevent dielectric 50 from emerging from perforated spray disk 21 at upper surface 19, dielectric 50A flows under a pressure p that is greater than atmospheric pressure, in a direction opposite to the working direction of tool electrode 51. Counterflushing with dielectric 50A guarantees that all detached particles flow out via lower surface 52, thus preventing any compensation for conicality. While the counterflushing process with dielectric 50A is still occurring, tool electrode 51 is moved out of perforated spray disk 21 toward lower surface 52, away from workpiece table 54.

The degree of conicality, i.e. the angle between wall 44 and an opening axis 60 of spray opening 25 running parallel to lengthwise valve axis 2, depends on a variety of parameters of the EDM process, such as the type, shape, and wear of tool electrode 51, the material of perforated spray disk 21, the nature of dielectric 50, 50A, and the magnitudes of the EDM voltage and discharge values. Another critical factor governing the conicality is the particular length/diameter ratio selected for spray opening 25. The EDM parameters can be left unchanged as compared with the production of, for example, cylindrical spray openings 25, since counterflushing with dielectric 50A has no influence of the usability of tool electrode 51. Conical spray openings 25 in perforated spray disks 21 can therefore be produced easily and with very high quality by electrical discharge machining proceeding from lower surface 52 against the later flow direction of the fuel, while simultaneously counterflushing with a dielectric 50A from upper surface 19 of perforated spray disk 21.

While the present invention has been described in relation to the above-described embodiment and method it is envisioned that other embodiments and methods may fall within the scope of the present invention.

What is claimed is:

1. A perforated spray disk for a valve having a lengthwise valve axis and a fluid flow direction, comprising:

an upper surface;

a lower surface;

a metal spray disk central region, the central region having at least one spray opening;

the at least one spray opening being formed by electrical discharge machining and having a frustoconical form which expands in the flow direction around an opening axis, the at least one spray opening frustoconically extending from the upper surface to the lower surface; and the opening axis and the lengthwise valve axis being parallel;

wherein the at least one spray opening of the perforated spray disk includes a plurality of spray openings and the spray openings are configured with identical spacing from one another.

2. The perforated spray disk as recited in claim 1 wherein there are four spray openings identically spaced from one another, the four spray openings forming a square shape, each of the four spray openings being positioned at a respective corner of the square shape.

* * * * *